Patented Sept. 20, 1938

2,130,789

UNITED STATES PATENT OFFICE 2,130,789

PURIFICATION OF LIQUIDS

Curtis Q. McW. Campbell, Pittsburgh, Pa.

No Drawing. Application June 17, 1935,
Serial No. 26,923

4 Claims. (Cl. 204—25)

This invention relates to the clarification of liquids, such as the aqueous wastes and wash waters from various industrial processes, and sewage. It relates especially to the treatment of sewage and other liquids containing organic matter in suspension or emulsion therein, although it is also applicable to the treatment and clarification of many other kinds of suspensions and emulsions.

The principal object of my invention is to provide an improved process of clarifying waste liquids and other suspensions and emulsions. Another object is to provide an improved coagulant for use in such a process. A further object is to provide a method of purifying liquids containing organic matter. A still further object is to provide a method of clarifying and simultaneously reducing the bacterial content of sewage and the like. Other objects and advantages of my invention will appear from the following description.

In my copending application, Serial No. 554,486, filed August 1, 1931, now Patent No. 2,051,983, I have described an improved coagulant and clarifying material and a method of using such material. This coagulant is prepared by making up an aqueous dispersion of starch containing about 1.5% to 10.0% or more of corn or potato starch, for example. This dispersion is then preferably heated sufficiently to expand the starch cells without rupturing a substantial portion of them, and then allowed to cool. The dispersion of expanded starch is then mixed with an alkaline reagent, such as a solution of caustic soda, caustic potash or ammonia, and this produces a coagulant which is useful for many purposes, as described in my Patent No. 1,942,507. In accordance with the procedure described in my pending application, however, the starch-caustic coagulant is then subjected to an electrolytic treatment which improves its properties, and when the electrolytic treatment is used the heating step may in some instances be omitted. The electrolytic treatment has the twofold effect of increasing the coagulative power of the sol or coagulant for most types of particles in suspension or emulsion in aqueous liquids, and also of imparting a marked bactericidal property to the coagulant. This bactericidal property is especially marked when the coagulant is subjected to electrolytic treatment in closed vessels, preferably with direct current, immediately before adding it to the liquid to be clarified or treated. Under such circumstances the electrolytic treatment has the effect of liberating nascent oxygen which is dissolved in or carried along with the coagulant.

I have now found that similarly beneficial results are obtained by adding oxygen, and especially nascent oxygen, to the liquid to be treated, with certain reagents or coagulants other than the starch-caustic coagulant previously described. I have also found that this is particularly beneficial if the nascent oxygen is formed from, or liberated by, or produced by the action of, a constituent of the coagulant under appropriate conditions, as the handling of the materials to obtain the desired results is thereby facilitated. With some compositions electrolytic treatment of the coagulant is necessary to obtain this result, but such is not always the case, and in some instances oxygen may be advantageously supplied from an external source either to replace or to supplement that obtained from the coagulant itself by electrolysis or otherwise.

Certain salts, such as salts of iron and aluminum, have a known coagulating effect under suitable conditions, and have been used heretofore to assist in clarifying waters and aqueous wastes in certain processes. I now propose to increase the effectiveness of such materials, as well as others, by suitable treatment prior to use. This treatment preferably has as its main feature the passage of an electric current through a solution of the selected salt or salts, and I have discovered that a freshly electrolyzed solution apparently has its coagulative power increased whether the current employed is direct or alternating, especially if the solution contains adsorptive or coagulative suspended matter. When it is desired to reduce or eliminate bacterial and other organic matters in addition to suspended solids, however, it is preferable to subject the solution to a direct current pretreatment, preferably in a vessel or conduit which is closed to the atmosphere. Water is thereby decomposed, and oxygen is liberated at the positive electrode while hydrogen is liberated at the negative electrode. The hydrogen may be vented to the atmosphere but the nascent oxygen is carried along with the solution, usually at least partially dissolved therein, and is added as promptly as possible to the liquid to be treated.

If it is difficult to correctly proportion the rate of flow of the solution or other coagulant and the current density and consequent oxygen liberation during the treatment, or if, for some other reason, it is difficult to get enough oxygen liberated and carried along with the solution to produce the desired effect, additional oxygen may be added from an external source. It is usually most convenient to conduct the electrolysis in a divided chamber or in a bent conduit similar to a U-tube.

The solution or other coagulant then flows in at one side or leg near the top, then down that side, under the partition or other dividing structure, and up the other side or leg to a discharge opening near the top. From this outlet the treated material is preferably discharged as directly as possible to the settling tank or sump containing sewage or other liquid to be treated. When a direct current pretreatment is employed, it is preferable to have the negative electrode positioned in the inlet leg or side of the cell, so that the hydrogen there liberated can readily be vented, while the positive electrode is mounted in the discharge or outlet side or leg of the cell. When additional oxygen is being supplied, it can be admitted at any convenient point along the path of the solution or other coagulant being treated, but it is preferably admitted into or near the outlet or positive side of the cell. When the oxygen supply is so connected, the oxygen can be added without interference with the treatment, regardless of whether the treater is operating on alternating or direct current, or even if it is not operating at all.

If the salt solution or other coagulant subjected to the electrolytic treatment contains chlorine, in the form of a chloride for example, some of this chlorine is also liberated at the positive terminal of the cell and may be carried along with the coagulant into the liquid to be clarified or purified. This is advantageous, especially when elimination of bacteria or organic matter is one of the objects of the treatment, as chlorine is very effective for that purpose. Also, the liberation of the chlorine makes the remaining solution more alkaline, especially when the chlorine comes from an alkali or alkaline earth chloride, and this is usually desirable as increased alkalinity facilitates the coagulation of suspended matter in, and the clarification of, many aqueous wastes. For these reasons it is often desirable to add to the coagulants which are to be subjected to my electrical treatment alkaline chloride which may not in itself have any direct coagulating effect, such as sodium chloride, for example.

A modification of the above procedure, which depends largely on the same properties of the reagents for its advantages, is also useful in many instances. In this modification I start with a solution of a suitable alkali or alkaline earth chloride, preferably sodium chloride, which may have any desired concentration, such as 1% to 20% or more. I have found that about 8% is a convenient concentration, and I will use that concentration for purposes of illustration in the following example. This salt solution is subjected to a direct current electrolytic treatment similar to that described hereinabove, and liberates chlorine at the positive electrode and hydrogen at the negative electrode while forming sodium hydroxide in solution. The treatment may be stopped as soon as the solution is saturated with chlorine, or before that time, or it may be continued until the sodium chloride is completely dissociated, or, at any time before that stage is reached. When the salt is completely dissociated the remaining solution contains about 5% caustic soda and is usually saturated with chlorine. In some cases chlorine may be exhausted to the atmosphere but it is preferably recovered and retained for further use, as will be described hereinbelow. The hydrogen evolved may also be wasted or it may be burned or otherwise utilized.

The resulting alkaline solution containing about 5% caustic soda, or more or less, for example, and usually containing dissolved chlorine and some residual sodium chloride, is then mixed with a suitable dispersion of amylaceous material to form a coagulant. The dispersion is preferably prepared substantially as described hereinabove, that is, by suspending and/or dissolving starch in water. The concentration of the dispersion may be from about 1% to 20% or more, but I generally prefer to initially prepare a suspension containing about 10% starch which is then preferably heated to expand the starch cells. This heating step may be omitted in some instances, but it is generally desirable to heat the suspension to a temperature of about 40° to 60° C. for a short time (e. g., about 15 to 20 minutes) to expand the starch cells substantially without rupturing them. Higher temperatures up to the boiling point may be employed if desired, but treatments at the higher temperatures should preferably be limited in time to prevent excessive degeneration of the starch. After the heating it is preferable to dilute the starch to a concentration of about 1% to 3%, although more concentrated solutions or suspensions may also be used with good effect.

The proportions in which the starch and the alkaline solutions are mixed, as well as their respective concentrations, may be varied over a rather wide range. For clarifying coal washery water containing 5 to 8% of fine particles of coal, for example, about 3 parts of a 1% starch dispersion and 4 parts of 3% caustic soda solution for each 2000 parts of water give good results. When treating more acid wastes, a higher proportion of alkaline reagent may be desired, and when treating substantially neutral or alkaline wastes containing very fine suspended or colloidal matter, it may be desirable to increase the proportion of starch with or without reducing the amount of caustic. For any particular application or set of operating conditions the optimum concentrations and proportions are readily determined by simple tests, but it is generally found that a wide range of concentrations and proportions give satisfactory results. It should be understood that if the mixture of starch dispersion and electrolytically decomposed chloride solution is not sufficiently alkaline in any given instance, as when the decomposition is not carried far enough or the solution is diluted excessively after the electrolytic treatment, additional alkaline reagent of any desired kind can be added to the mixture before use.

In many instances it is desirable to subject the coagulative mixture to further electrolytic treatment to increase its activity and to liberate more nascent oxygen and/or chlorine just before the mixture is added to the liquid to be clarified or purified. When this is done, the initial electrolytic treatment of the salt solution may be omitted, and the starch dispersion is then mixed directly with a salt solution which may also contain any desired amount of alkaline reagent. This is usually preferable when the costs of electric power and the sodium chloride or other salt employed are high as compared with the cost of the alkaline reagent, and it may be preferable whenever relatively small amounts of chlorine and/or oxygen are required for the satisfactory treatment of any particular liquid.

The coagulative mixture of starch dispersion, alkaline reagent and dissolved chlorine and/or oxygen, usually containing some salt which may or may not have a coagulative effect by itself, which mixture is produced by any of the above described alternative procedures, is then added to the liquid to be treated. This may be done by introducing the mixture into a flume or other conduit, which is preferably provided with baffles or mixing devices, through which the liquid to be treated is delivered into a settling tank or other clarifying receptacle of suitable known form. Alternatively, the mixing flume may be omitted and a simple discharge pipe may be employed, with or without a mixing pump. The impurities in suspension or emulsion in the liquid are rapidly coagulated in the presence of my coagulant, and settle to the bottom of the tank, from which they are withdrawn as sludge. The clarified liquid generally overflows the top of the tank, and is discharged or returned to the process in which it originated or otherwise disposed of. When elimination of bacteria or dissolved organic matter is an essential requirement of the treatment, the chlorine liberated in the salt decomposition stage, or obtained elsewhere, and/or the oxygen obtained by electrolysis or otherwise, and/or other material capable of liberating oxygen, such as a hypochlorite, may be supplied to the liquid in the tank in any suitable manner during the coagulation. Alternatively, the sewage or other liquid containing undesired substances in suspension or in emulsion may be treated with the coagulant and thereby clarified as described hereinabove, and the clarified effluent may then be treated with the chlorine and/or oxygen and/or other oxygen-liberating compound.

In any case, very effective coagulation and clarification are obtained in a relatively short time, and the process is so flexible that it is readily adapted to the simultaneous removal of any required amount of bacterial and organic matter in the most economical manner, regardless of local or varying market conditions.

I claim:

1. The process of treating impure aqueous liquids which comprises forming an aqueous dispersion of starch, mixing the dispersion with an alkaline solution containing a chloride to produce a coagulative sol, passing an electric current through the sol to liberate oxygen and chlorine, adding the sol to said impure liquid, and separating purified liquid from substances concentrated by said sol.

2. The process of preparing a bactericidal coagulant, which comprises forming an aqueous solution of sodium chloride, passing an electric current therethrough to decompose the chloride and liberate chlorine while forming an alkaline solution having chlorine dissolved therein, mixing the solution with an aqueous dispersion of expanded starch to form a coagulative sol having bactericidal properties, and subjecting the sole to further electrolytic treatment to improve its coagulative and bactericidal properties.

3. The process of treating sewage and the like, which comprises forming an aqueous solution of sodium chloride, passing an electric current therethrough to decompose the chloride and liberate chlorine while forming an alkaline solution with chlorine dissolved therein, withdrawing excess chlorine separately from the solution, mixing the solution with an aqueous dispersion of expanded starch to form a coagulative sol having bactericidal properties, mixing the sol with said sewage to be treated, separating clarified liquid from substances concentrated by said sol, and contacting the clarified liquid with the said excess chlorine to further reduce its bacterial content.

4. The process of preparing a bactericidal coagulent for the treatment of impure liquids, which comprises forming an aqueous solution containing a chloride selected from the class consisting of alkali and alkaline earth chlorides, passing an electric current through the solution to decompose the chloride and liberate chlorine while forming an alkaline solution having chlorine dissolved therein, mixing the solution with an aqueous dispersion of expanded starch to form a coagulative sol having bactericidal properties, and subjecting the sol to further electrolytic treatment to improve its coagulative and bactericidal properties.

CURTIS Q. McW. CAMPBELL.